Aug. 20, 1963     D. A. TAYLOR     3,100,941
MEASURING TAPE TENSION HOLDER
Filed July 28, 1961
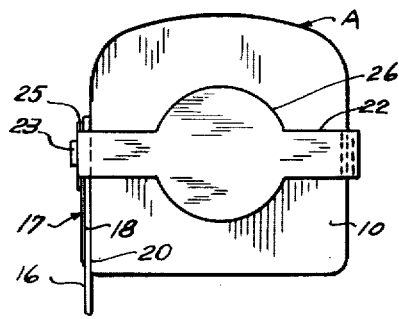
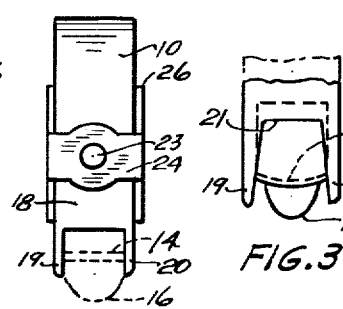
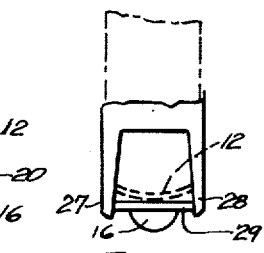
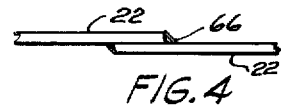
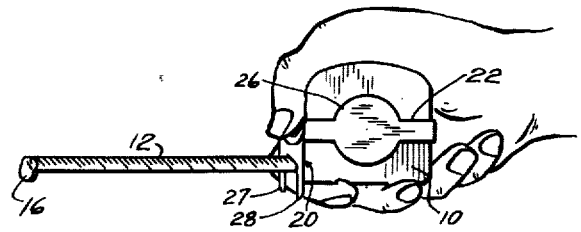
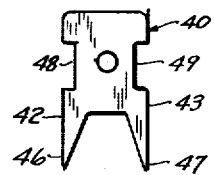
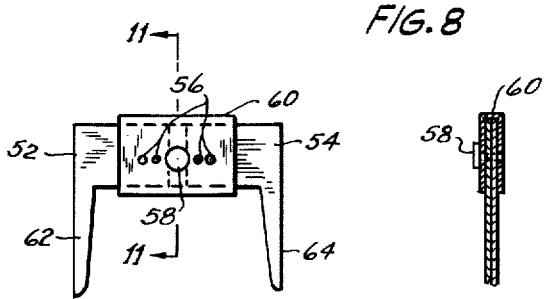
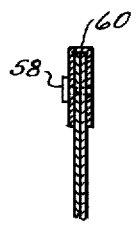
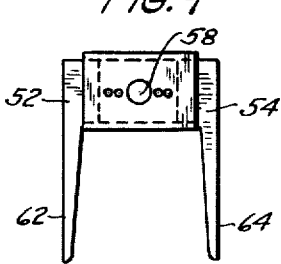
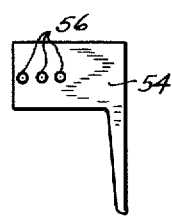
INVENTOR.
DON A. TAYLOR
BY
ATTORNEY.

United States Patent Office 3,100,941
Patented Aug. 20, 1963

3,100,941
MEASURING TAPE TENSION HOLDER
Don A. Taylor, 216 Mill St., Box 4, Wadsworth, Ohio
Filed July 28, 1961, Ser. No. 127,550
11 Claims. (Cl. 33—189)

This invention relates to an attachment for a measuring device of the type including a spring steel tape tensionally coiled on a self-winding spool within a casing, the free end of the tape extending out of a slot in the casing, and particularly to an attachment for releasably securing the tape in preselected extended positions.

In measuring tapes of the type mentioned, when the free end of the tape is withdrawn from the casing, it must be held under tension either manually, or by a suitable securing device to prevent the spool in the casing from rewinding the tape.

Various securing devices have been provided for retaining the tape in extended position so as to permit the hands of the operator greater freedom in measuring and marking workpieces. However, most of such prior devices are of complicated structures and most generally are built into the casing. They materially increase the overall cost of the measuring tape, yet leave unsolved the problem of providing tape securing means for those extendible measuring tapes already in the hands of the user.

An object is to provide for extendible measuring tapes a securing device which may be simply and quickly attached to, and detached from, the exterior of the tape casing.

A specific object is to provide a device of the above type having coacting scribing means thereon, for forming scribe marks on workpiece being measured.

A further object of the invention is to provide a detachable tape securing device which is exceedingly simple in structure, inexpensive to manufacture, and highly effective in operation, and which can be instantly installed on and removed from the casings of conventional tapes of this character.

Self-winding measuring tape devices generally comprise a casing having a spool therein on which the tape is wound, a spring being connected to the spool so that, as the spring steel tape is pulled free end foremost out of the slot in the casing, the spring is tensioned for rewinding the tape. The detachable tape securing device of the present invention is detachably mounted on the casing and has a securing element positioned adjacent the slot. The element is movable transversely of the slot in a path normal to the face of the tape into and out of engagement with the tape. The securing element is mounted on a resilient endless band adapted to embrace the casing with a snug frictional fit, at least that portion of the band carrying the holding element being deflectable edgewise and thereby supporting the element so that it may be reciprocated on the casing along said path to the extent necessary to engage and secure the extended tape.

The securing element includes a body which may be substantially planular and which has a bifurcated end portion of which the prongs are adapted to straddle the tape and frictionally bind against its lateral edges with force sufficient to secure and hold the tape in extended position against the action of the spring operated spool in the casing.

At least one of the prongs has its free end sharpened to provide a scribing point for forming a scribe mark on an associated workpiece being measured. Generally the resilient band is only sufficient to hold the element lightly in position as the force with which the element is drawn in face to face juxtaposition with the casing holds it from displacement relative to the casing once it is in operating position.

Various objects and advantages of the invention will be apparent from the following description wherein reference is made to the drawings in which:

FIG. 1 is a side elevational view of a self-reeling measuring tape with the tape securing device of the invention installed thereon;

FIG. 2 is a front elevational view of the structure shown in FIG. 1;

FIG. 3 is a fragmentary front elevational view of the lower portion of the tape securing device shown in FIG. 1;

FIG. 4 is an enlarged side cross sectional view showing the joint in the resilient band of the device;

FIG. 5 is a perspective view of the tape and an operator's hand, with the tape extended, and showing the tape securing device being manually operated to position the holding element in operating position;

FIG. 6 is a perspective view of the tape of FIG. 1, and showing one manner of operation of the scribing points on the tape securing element;

FIG. 7 is a fragmentary front elevational view of a modification of the tape securing device;

FIG. 8 is a front elevational view of a further modification of the tape securing element of the device;

FIG. 9 is a front elevational view of a still further modification of the securing element of the device;

FIG. 10 is a front elevational view of the tape securing device shown in FIG. 9 and showing the parts thereof in a different operating position;

FIG. 11 is a sectional view taken on the line 11—11 of FIG. 9; and

FIG. 12 is a front elevational view of the right hand prong portion of the element shown in FIGS. 9 and 10.

Referring to the drawings, the invention is adapted for use on a conventional spring steel measuring tape mechanism A of the type including an upstanding, hollow housing or casing 10 having a coiled spring steel measuring tape 12 therein. The coiled tape 12 is wound on a conventional spring-operated rewind spool, not shown, in the casing 10, the spring of which is wound by pulling out the tape. The free end of the tape 12 extends out of a slot 14 in the lower section of the casing. When the tape is withdrawn from the casing, the withdrawn portion must be held manually under tension to prevent the spring from retrieving the tape. The free end of the tape is provided with a hooked stop 16 extending across the tape and normal to the tape width to prevent the free end of the tape from being drawn into the slot 14. The hooked stop 16 is used also for engaging the edge of an object or workpiece to be measured, so that the free end of the tape may be retained in such extended position and cause the tape to be unreeled for measurement taking purposes by drawing the casing 10 along the workpiece. The structure of the measuring tape mechanism A thus far described is conventional, such structure of itself forming no part of the present invention.

In accordance with the invention, a tape locking device 17 is provided. The locking device 17 includes a generally planular base portion 18 having at one end a bifurcated end portion in the form of a pair of spaced, substantially parallel prongs 19 and 20 disposed in the plane of the base portion. The prongs 19 and 20 diverge away from the base portion toward their free ends, as best shown in FIG. 3, for wedging cooperation with the lateral edges of the extended tape 12 when the device is moved toward the measuring face of the tape, prongs foremost, to operating position. The prongs 19 and 20 may be spaced apart to the extent such that only the edge 21 of the base portion 18 frictionally contacts the tape and thus secures it in extended position, but engagement of the tape by the inner edges of the prongs, or by both the prongs and the edge 21, is preferred.

For supporting the device on the casing for movement into and out of operating position, a suitable mounting means detachably engaging the casing is provided. The mounting means preferably is in the form of a resilient endless strap or band 22 to which the base portion 18 is connected by suitable means, such as a rivet 23, at the front portion 24 of the band. The band 22 embraces the casing 10 with a snug frictional fit in a position such that the front portion 24 is reciprocable to a limited extent normal to the face of the tape, which is in a vertical direction on the casing 10, whereby the device may be moved toward and away from the adjacent extended tape 12.

In the preferred form, the locking device 17 is disposed above the slot 14 and thus above the extended tape 12, whereby the locking device may be moved downwardly to an operative securing position wherein its prongs are in frictional contact with the lateral edges of the tape.

The frictional fit of the band 22 on the casing 10 is tight enough to retain the forward portion 24 in any preselected position into which it is reciprocated. An abrasive material 25 may be provided on the inner face of the band front portion 24 to better retain the locking device in any reciprocated position in which it is placed.

In operation, the locking device 17 may be manually pushed downwardly on the casing 10 whereby the spaced prongs 19 and 20 straddle the extended tape 12 and frictionally contact the lateral edges thereof with a minimum predetermined frictional force such that, when the device is pulled by the tape against the casing, it retains the tape in the preselected extended position to which the tape has been pulled.

In FIG. 7 a modification is shown wherein the prongs 27 and 28 may be mutually reinforced by a suitable cross brace 29.

FIG. 8 shows a modified tape securing portion 40 wherein the spaced, parallel prongs 42 and 43 have their free ends formed into scribing points 46 and 47, respectively, for forming a scribe-mark on an associated workpiece to be measured. Cut back portions or grooves 48 and 49 may be provided for receiving the band 22 therein to form a more efficient connection between the securing device and the band.

The securing portion may be made adjustable for cooperation with tapes of different widths. For example, as shown in FIGS. 9 through 12, a pair of coacting mating elements 52 and 54 may be employed. Each element has a row of apertures 56 adapted to be aligned with the apertures in the other element, selectively, such that the elements may be detachably connected together by a bolt or rivet 58 in spaced parallel relation as shown. A sleeve or tubular portion 60 may be placed over the resultant joint for appearance and protective purposes. With this construction, the spacing between the prongs 62 and 64 may be adjusted to accommodate tapes of various widths.

The endless band 22 may be formed of any suitable resilient material such as rubber or plastic. Its free ends may be overlapped and cemented together by suitable cement 66, as shown in FIG. 4, to form such endless band.

Although the securing device has been described as being detachable from the casing 10, it will be understood that it may be affixed permanently thereto.

Having thus described my invention, I claim:

1. An attachment for a measuring tape of the type including a casing and a spring returned coiled spring steel measuring tape therein and adapted to be drawn endwise out of an opening in the casing, said attachment comprising a tape securing device, and attaching means for detachably mounting the device on the exterior of the casing at one edge face of the casing and adjacent the tape opening for movement along said edge to and from operating position, and said device, when moved to operating position, releasably being operative to, frictionally engaging the lateral edges of the tape exteriorly of the casing with force capable of securing the device in fixed relation to the tape and to hold the tape in selected extended positions.

2. The structure of claim 1 wherein the said mounting means is permanently connected to the device and is adapted to fit the casing so as to support the device in juxtaposed face-to-face relation to said edge face of the casing for movement relative to said face normal to a face of the tape and for movement into juxtaposition with said face of the casing by the tape when the device is in operating position.

3. The structure of claim 1 wherein said mounting means is a band embracing the casing with a snug frictional fit.

4. The structure of claim 3 wherein said band completely encircles the casing and supports said device for reciprocable movement in a direction normal to the face of the tape.

5. The structure of claim 1 wherein said device comprises a generally planular body having at one end two laterally spaced prongs adapted to receive the tape flatwise therebetween and frictionally contact the opposite laterally edges of the tape, respectively, with said force to secure the tape against rewinding.

6. The structure of claim 5 wherein at least one of said prongs has its free end sharpened and provides a scribing point for forming a scribe mark on an associated workpiece being measured.

7. The structure of claim 5 wherein said prongs are joined by a transversely extending cross brace.

8. The structure of claim 5 wherein the prongs diverge from the body outwardly toward their free ends for wedging cooperation with the lateral edges of the tape.

9. The structure of claim 1 wherein said body is in the form of a coacting pair of separable prong members detachably connected together in laterally spaced operating relation, and connecting means for detachably connecting the prong members together in different laterally adjusted positions relative to each other.

10. A measuring mechanism comprising a hollow upstanding casing, a spring steel type measuring tape tensionally coiled within the casing, said casing having an opening on a lower section thereof through which a free end of the tape extends, a resilient band encircling the casing about an axis normal to the face of the tape in spaced relation to the opening with a snug frictional fit whereby at least that portion of the band disposed adjacent said opening may be manually reciprocated to preselected positions on the casing in a direction normal to the face of the tape, said frictional fit being tight enough to retain said portion of the band in any such preselected position in which it is placed, and a tape locking device disposed on said portion of the band above said opening, said device including a body having a bifurcated end portion adapted to straddle the extended portion of the tape and frictionally contact the edges of the same with a predetermined force when said portion of the band is reciprocated to a preselected lower position and thereby retain the tape in any one of a plurality of preselected extended positions.

11. A measuring mechanism comprising a hollow upstanding casing, a spring steel type measuring tape tensionally coiled in the casing, said casing having an opening on the lower section thereof through which the free end of the tape extends, a tape locking device, means mounting the tape locking device on the exterior of the casing for movement along one edge face of the casing toward and away from the tape, said tape locking device including two prongs spaced apart laterally of the tape from each other and adapted to straddle the extended portion of the tape and frictionally contact the edges of the tape with a predetermined frictional binding force when the device is moved a predetermined distance toward the tape along said edge of the casing, and thereby to retain the tape in any one of a plurality of preselected positions.

References Cited in the file of this patent

UNITED STATES PATENTS

| | | |
|---|---|---|
| 2,132,202 | Carlson | Oct. 4, 1938 |
| 2,549,503 | McCully | Apr. 17, 1951 |
| 2,599,320 | Dart | June 3, 1952 |
| 2,759,696 | Nelson | Aug. 21, 1956 |

FOREIGN PATENTS

| | | |
|---|---|---|
| 527,414 | Germany | June 17, 1931 |

UNITED STATES PATENT OFFICE
CERTIFICATE OF CORRECTION

Patent No. 3,100,941                      August 20, 1963

Don A. Taylor

It is hereby certified that error appears in the above numbered patent requiring correction and that the said Letters Patent should read as corrected below.

Column 1, line 22, strike out "of"; line 34, for "workpiece" read -- workpieces --; column 4, line 17, for "releasably being operative to" read -- being operative to releasably --; line 18, for "engaging" read -- engage --; same column 4, line 41, for "laterally" read -- lateral --; column 6, lines 8 to 15, the References Cited list should appear as shown below instead of as in the patent:

UNITED STATES PATENTS

| | | | |
|---|---|---|---|
| 421,133 | Grierson | Feb. 11, | 1890 |
| 2,132,202 | Carlson | Oct. 4, | 1938 |
| 2,549,503 | McCully | Apr. 17, | 1951 |
| 2,575,354 | Mills | Nov. 20, | 1951 |
| 2,599,320 | Dart | June 3, | 1952 |
| 2,649,787 | Kobayashi | Aug. 25, | 1953 |
| 2,759,696 | Nelson | Aug. 21, | 1956 |
| 2,807,886 | Aciego | Oct. 1, | 1957 |

FOREIGN PATENTS

| | | | |
|---|---|---|---|
| 1,939 | Great Britain | Jan. 24, | 1914 |
| 527,414 | Germany | June 17, | 1931 |

Signed and sealed this 4th day of February 1964.

(SEAL)
Attest:
ERNEST W. SWIDER

Attesting Officer

EDWIN L. REYNOLDS

Acting Commissioner of Patents